US010608270B2

(12) United States Patent
Autrusson et al.

(10) Patent No.: US 10,608,270 B2
(45) Date of Patent: Mar. 31, 2020

(54) DEVICE FOR GENERATING GASEOUS DIHYDROGEN

(71) Applicant: ARIANEGROUP SAS, Paris (FR)

(72) Inventors: Nicolas Autrusson, Bordeaux (FR); Arnaud Fournet, Kourou (FR); Thierry Feraille, Bordeaux (FR)

(73) Assignee: ARIANEGROUP SAS, Paris (FR)

( * ) Notice: Subject to any disclaimer, the term of this patent is extended or adjusted under 35 U.S.C. 154(b) by 209 days.

(21) Appl. No.: 15/738,698

(22) PCT Filed: Jun. 28, 2016

(86) PCT No.: PCT/FR2016/051586
§ 371 (c)(1),
(2) Date: Dec. 21, 2017

(87) PCT Pub. No.: WO2017/001756
PCT Pub. Date: Jan. 5, 2017

(65) Prior Publication Data
US 2018/0222751 A1   Aug. 9, 2018

(30) Foreign Application Priority Data

Jun. 30, 2015   (FR) ..................................... 15 56116

(51) Int. Cl.
*H01M 8/06* (2016.01)
*H01M 8/0606* (2016.01)
(Continued)

(52) U.S. Cl.
CPC .......... *H01M 8/0606* (2013.01); *B64D 41/00* (2013.01); *C01B 3/0005* (2013.01);
(Continued)

(58) Field of Classification Search
None
See application file for complete search history.

(56) References Cited

U.S. PATENT DOCUMENTS

| 4,018,190 A | 4/1977 | Henault |
| 2009/0110973 A1* | 4/2009 | Kong ...................... C01B 3/065 |
| | | 429/421 |

(Continued)

FOREIGN PATENT DOCUMENTS

| GB | 1 509 184 A | 5/1978 |
| GB | 1 568 374 A | 5/1980 |

OTHER PUBLICATIONS

International Search Report as issued in International Patent Application No. PCT/FR2016/051586, dated Oct. 11, 2016.

*Primary Examiner* — Ula C Ruddock
*Assistant Examiner* — Tony S Chuo
(74) *Attorney, Agent, or Firm* — Pillsbury Winthrop Shaw Pittman LLP

(57) ABSTRACT

A device for generating gaseous dihydrogen, includes a body defining an inside volume having present therein a storage first compartment defined by a first wall and for receiving a hydrogen storage material; a conveyor second compartment, the first compartment surrounding the second compartment and being separated therefrom by a second wall, a conveyor system being present in the second compartment and configured to transport the hydrogen storage material from an inlet of the second compartment communicating with the first compartment to an outlet of the second compartment; and a recovery support in communication with the outlet of the second compartment and connected to the first and second walls, the support being movable in the first compartment. The device also includes a drive system for actuating the conveyor system and the movement of the recovery support in the first compartment; and a heater system configured to heat the second compartment.

11 Claims, 2 Drawing Sheets

(51) Int. Cl.
 *F17C 11/00* (2006.01)
 *C01B 3/00* (2006.01)
 *B64D 41/00* (2006.01)
(52) U.S. Cl.
 CPC ...... *F17C 11/005* (2013.01); *B64D 2041/005* (2013.01); *H01M 2250/20* (2013.01); *Y02E 60/321* (2013.01); *Y02E 60/324* (2013.01); *Y02P 90/45* (2015.11); *Y02T 90/32* (2013.01)

(56) References Cited

U.S. PATENT DOCUMENTS

2014/0162156 A1* 6/2014 Boudjemaa ......... H01M 8/0606
 429/426
2017/0283258 A1* 10/2017 Hornung ................... B01J 8/20

* cited by examiner

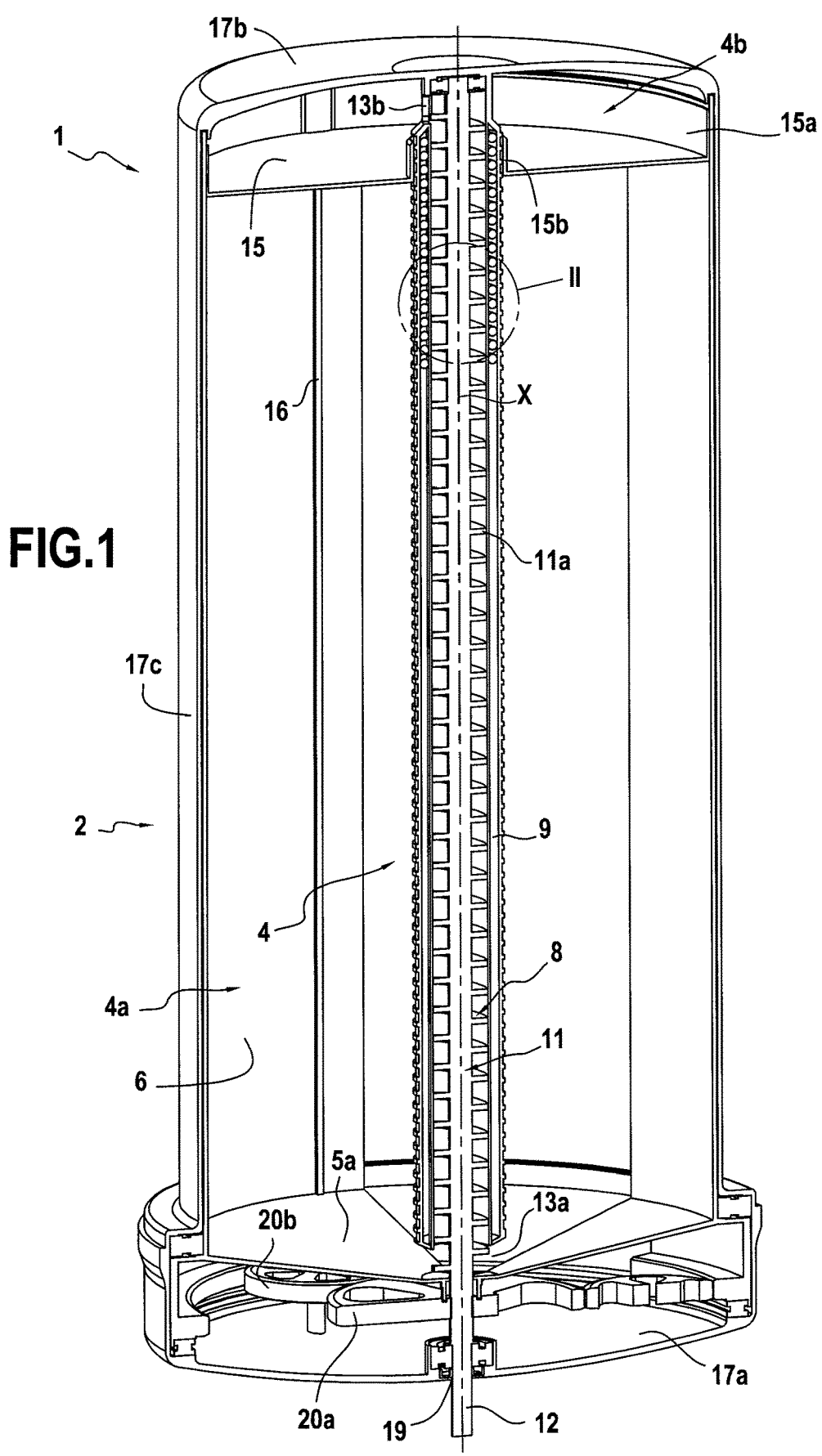

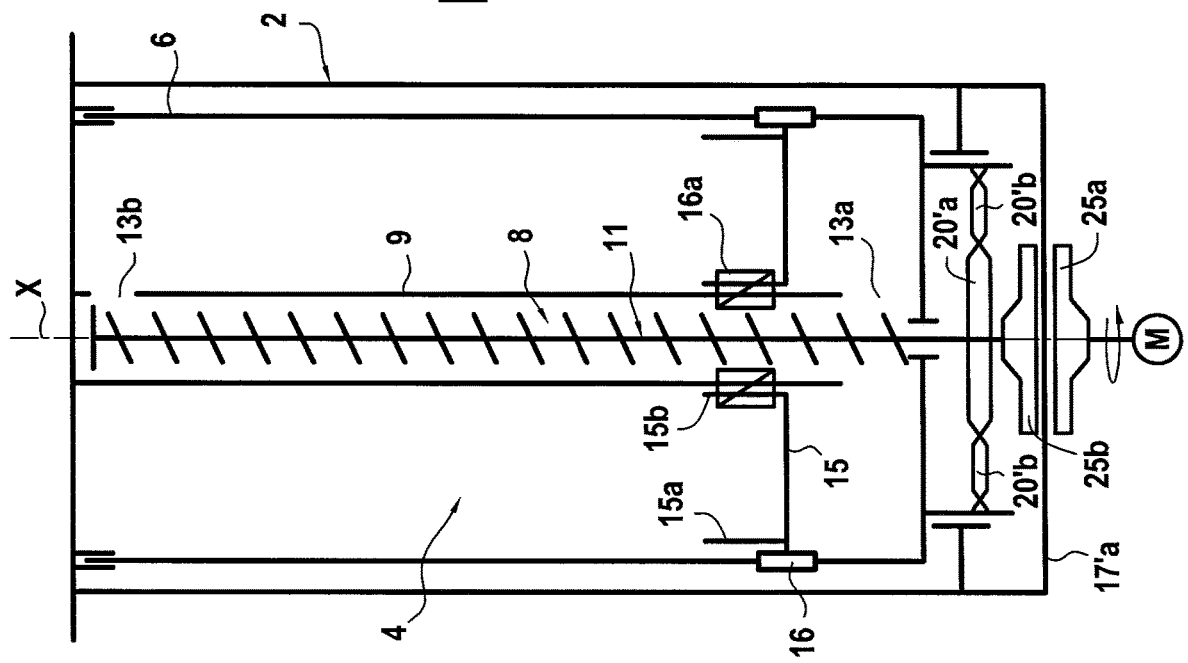
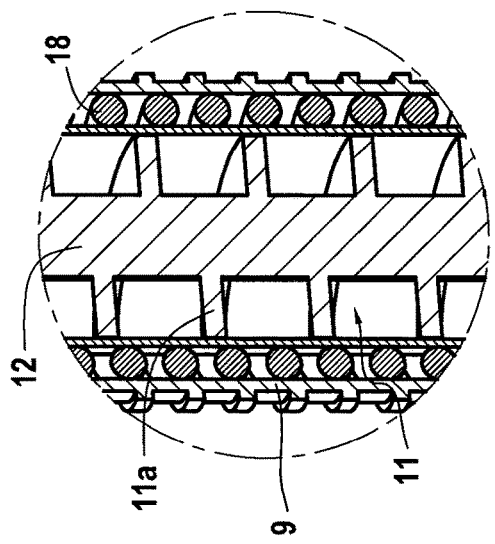
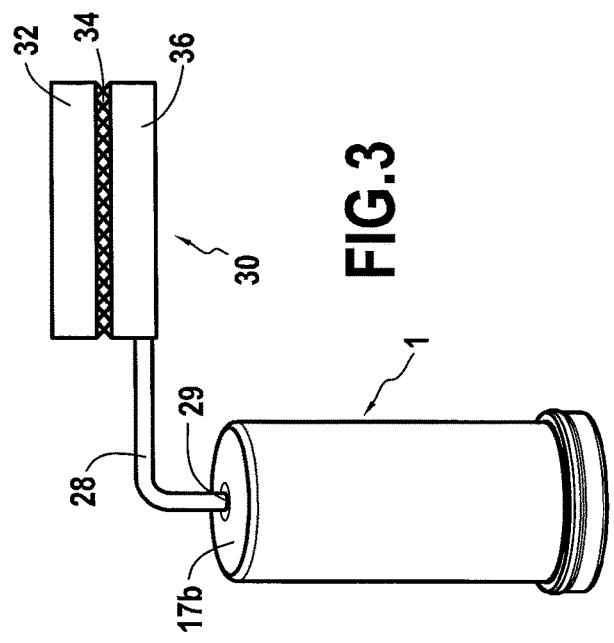

DEVICE FOR GENERATING GASEOUS DIHYDROGEN

CROSS REFERENCE TO RELATED APPLICATIONS

This application is the U.S. National Stage of PCT/FR2016/051586 filed Jun. 28, 2016, which in turn claims priority to French Application No. 1556116 filed Jun. 30, 2015. The contents of both applications are incorporated herein by reference in their entirety.

BACKGROUND OF THE INVENTION

The invention relates to a device for generating gaseous dihydrogen, for use in particular in feeding a fuel cell on board an aircraft.

Various devices for generating dihydrogen for feeding to a fuel cell are known in the state of the art. Nevertheless, it would be desirable to improve such devices by making them more compact.

There therefore exists a need to provide novel devices for generating dihydrogen that are more compact than existing devices.

There also exists a need to provide compact fuel cell systems, in particular for integrating in an aircraft.

OBJECT AND SUMMARY OF THE INVENTION

To this end, in a first aspect, the invention provides a device for generating gaseous dihydrogen, the device comprising:
  a body defining an inside volume having present therein:
    a storage first compartment defined by a first wall and for receiving a hydrogen storage material;
    a conveyor second compartment, the first compartment surrounding the second compartment and being separated therefrom by a second wall, a conveyor system being present in the second compartment and being configured to transport the hydrogen storage material from an inlet of the second compartment communicating with the first compartment to an outlet of the second compartment; and
    a recovery support in communication with the outlet of the second compartment and connected to the first and second walls, said support being configured to be moved in the first compartment;
  a drive system for actuating the conveyor system and the movement of the recovery support in the first compartment; and
  a heater system configured to heat the second compartment.

The invention makes it possible advantageously to provide a device for generating gaseous dihydrogen that is particularly compact and lightweight as a result of a particular arrangement in which the first and second compartments are placed in the same enclosure, the first compartment surrounding the second compartment, and in which the spent hydrogen storage material (i.e. the material that has been transformed under the effect of heat so as to release gaseous dihydrogen) is recovered in the same enclosure. The solution proposed by the present invention thus makes it possible to reduce very significantly the overall size of the device compared with a solution in which the hydrogen storage material, the conveyor system, and the spent hydrogen storage material are each present in respective separate enclosures.

The recovery support is designed to recover the spent hydrogen storage material. By way of example, the recovery support may be in the form of a recovery tray. In a variant, the recovery support may present a bottom having a shape that is not plane, such as a concave or a convex shape.

In an embodiment, the heater system may be configured to heat the second compartment by induction, and in particular to heat the conveyor system present in the second compartment. In a variant, the heater system may be configured to heat the second compartment by resistive heating.

In an embodiment, the conveyor system and the movement of the recovery support may be configured to be driven by a single motor of the drive system.

In an embodiment, the drive system may include at least one motor configured to actuate at least the conveyor system via a magnetic coupling.

Such an embodiment makes it possible advantageously to give the body excellent sealing against dihydrogen.

In an embodiment, the conveyor system may be in the form of a conveyor screw.

In an embodiment, a first edge of the recovery support may be connected to one of the first and second walls via a slideway connection and a second edge of said support may be connected to the other one of the first and second walls via a helical connection, and the first and second walls may be configured to be caused to rotate relative to each other by the drive system so as to cause the recovery support to move along the longitudinal axis of the first compartment.

In an embodiment, a first edge of the recovery support may be connected to the first wall via a slideway connection, and a second edge of said support may be connected to the second wall via a helical connection, and the first and second walls may be configured to be caused to rotate relative to each other by the drive system so as to cause the recovery support to move along the longitudinal axis of the first compartment. Under such circumstances, the drive system may be configured to cause the first wall to rotate and the second wall may be configured to remain stationary.

The present invention also provides a fuel cell system comprising:
  a device as described above; and
  a fuel cell having its anode connected to said device, the anode being designed to be fed with the gaseous dihydrogen generated by said device.

The present invention also provides an aircraft fitted with a system as described above.

The present invention also provides a method of generating gaseous dihydrogen by using a device as described above in which a hydrogen storage material is present in the first compartment, the method comprising the drive system actuating the conveyor system in order to transport the hydrogen storage material from the inlet of the second compartment towards the outlet of the second compartment, the hydrogen storage material being heated by the heater system while it is being transported in the second compartment in order to generate gaseous dihydrogen, the spent hydrogen storage material being recovered by the recovery support at the outlet of the second compartment.

In an implementation, the hydrogen storage material may be in granular form.

The present invention also provides a method of feeding a fuel cell with dihydrogen, the method comprising generating gaseous dihydrogen by performing a method as described above, and taking the gaseous dihydrogen as generated in this way to the anode of a fuel cell.

BRIEF DESCRIPTION OF THE DRAWINGS

Other characteristics and advantages of the invention appear from the following description of particular embodiments of the invention given as non-limiting examples and with reference to the accompanying drawings, in which:

FIG. 1 is a longitudinal section view of an example device of the invention;

FIG. 2 shows a detail of the FIG. 1 device;

FIG. 3 shows an example system of the invention; and

FIG. 4 is a diagrammatic view of a variant of the invention.

DETAILED DESCRIPTION OF EMBODIMENTS

FIG. 1 shows an example device 1 of the invention for generating gaseous dihydrogen. The device 1 comprises a body 2 defining an inside volume having present therein a storage first compartment 4 that is laterally defined by a first wall 6. The body 2 extends along a longitudinal axis X and is defined longitudinally by a bottom wall 17a and a top wall 17b. The body 2 also has a side wall 17c surrounding the first wall 6 and the first compartment 4. In the example shown, the axis X also constitutes the longitudinal axis of the first compartment 4. The first compartment 4 is longitudinally defined by a bottom wall 5a of the first compartment and by the top wall 17b. A recovery support, e.g. in the form of a recovery tray 15 as shown, is present in the first compartment 4 and is configured to move along the longitudinal axis X of the first compartment 4, as described in greater detail below. Naturally, it would not go beyond the ambit of the invention for the bottom wall of the recovery support to present a shape that is not plane, e.g. a shape that is concave or convex.

A conveyor second compartment 8 is present in the inside volume defined by the body 2. The first compartment 4 surrounds the second compartment 8. The second compartment 8 extends along the longitudinal axis X of the first compartment 4. A wall 9 laterally surrounds the second compartment 8. The wall 9 presents a helical thread on its face situated beside the first compartment 4. The wall 9 presents a first end situated beside the bottom wall 5a of the first compartment 4. An inlet 13a of the second compartment 8 communicating with the first compartment 4 is situated at this first end. Likewise, the wall 9 presents a second end situated beside the top wall 17b. An outlet 13b of the second compartment 8 communicating with the first compartment 8 and with the tray 15 is situated at this second end.

The first compartment 4 presents a bottom portion 4a situated between the bottom wall 5a of the first compartment and the tray 15. The bottom portion 4a of the first compartment 4 is for receiving a hydrogen storage material (not shown). The bottom portion 4a of the first compartment 4 communicates with the inlet 13a of the second compartment 8. In addition, the first compartment 4 presents a top portion 4b situated between the tray 15 and the top wall 17b. The top portion 4b of the first compartment 4 is for receiving spent hydrogen storage material (not shown). The top portion 4b of the first compartment 4 communicates with the outlet 13b of the second compartment 8. As shown, the top portion 4b of the first compartment 4 is superposed on the bottom portion 4a of the first compartment 4. The top portion 4b of the first compartment 4 is situated above the bottom portion 4a of the first compartment 4. The bottom and top portions 4a and 4b of the first compartment 4 are offset along the longitudinal axis X of the first compartment 4. The tray 15 separates the bottom portion 4a of the first compartment 4 from the top portion 4b of the first compartment.

The hydrogen storage material may be in granular form, e.g. in the form of a powder, of beads, or of pellets. By way of example, the hydrogen storage material may be borazane ("ammonia borane"). In a variant, the hydrogen storage material may be in the form of beads encapsulating hydrogen, the walls of these beads being suitable for becoming permeable to hydrogen under the effect of heat. Under such circumstances, the walls of the beads may be made of silica, for example.

A conveyor system 11, which is in the form of a conveyor screw in the example shown, is present in the second compartment 8 and is configured to transport the hydrogen storage material from the inlet 13a of the second compartment 8 towards the outlet 13b of the second compartment 8. The conveyor screw 11 may have a core that is hollow or solid. The conveyor screw 11 may optionally be of varying pitch. The conveyor screw 11 may be made of a metal material, e.g. a steel, that can be heated by induction. As shown, the conveyor screw 11 in the example illustrated extends along the longitudinal axis X. The conveyor screw 11 is configured to transport the hydrogen storage material along the longitudinal axis X. The conveyor screw 11 comprises a shaft 12 that is to be caused to rotate about the longitudinal axis X by a drive system (not shown) having one or more motors. The conveyor screw 11 defines a helical spiral 11a that serves, during rotation of the shaft 12, to transport the hydrogen storage material in the second compartment 8 along the longitudinal axis X. In the example shown, the shaft 12 of the conveyor screw 11 passes through the bottom wall 17a via an orifice 19 that is connected to a motor of the drive system, which is situated outside the body 2. A sealing system such as a mechanical seal may be present in the orifice 19 in order to seal against the dihydrogen that is generated.

In the example shown, the conveyor screw 11 and movement of the recovery tray 15 are driven by a single motor of the drive system. The description below describes this aspect in detail. The shaft 12 is configured to cause the first wall 6 to rotate. More precisely, the shaft 12 is configured to drive rotation of the first wall 6 via a system of gears, e.g. comprising an inner toothed wheel 20a co-operating with one or more outer toothed wheels 20b. The inner toothed wheel 20a is situated on the shaft 12 and the outer toothed wheel(s) 20b co-operate with the first wall 6. Advantageously, the gear system constitutes an epicyclic gear train having an inner toothed wheel 20a and a plurality of outer toothed wheels 20b, the wall 6 itself having teeth. It would not go beyond the ambit of the invention for the gear systems to have a plurality of inner toothed wheels with each of these toothed wheels being connected to an outer toothed wheel. Consequently, when the drive system causes the shaft 12 to move in rotation, this movement in rotation is transmitted via the gear system to the first wall 6. A single motor of the drive system thus serves to drive both the conveyor system and rotation of the first wall 6. Rotation of the first wall 6 serves to actuate the movement of the tray 15 in the first compartment 4. Specifically, the tray 15 presents a first edge 15a connected to the first wall 6 via a slideway connection 16. Thus, the first wall 6 presents a plurality of grooves extending along the axis X and along which the tray 15 can slide. The tray 15 presents a second edge 15b connected to the second wall 9 by a helical connection. The drive system is configured to cause the shaft 12 to rotate, which is itself configured to drive rotation of the first wall 6. While the first wall 6 is rotating, the second wall 9 and the side wall 17c of the body 2 remains stationary. Rotation of the first wall 6 about the longitudinal axis X leads to the tray 15 moving in translation along the longitudinal axis X in combination with moving in rotation about the longitudinal axis X. It would not go beyond the ambit of the invention for the drive system to include a first motor configured to actuate the conveyor system and a second motor, distinct from the first, configured to drive rotation of the first wall and the movement of the recovery tray within the first compartment. It would not go beyond the ambit of the invention for one edge of the recovery tray to be connected to the second wall via a slideway connection while another edge of the tray is connected to the first wall via a helical connection, and in which the drive system is configured to cause the first and second walls to move in relative rotation in order to cause the tray to move along the longitudinal axis X. Under such circumstances, the drive system may be configured to cause the second wall to rotate about the axis X while the first wall remains stationary.

The device 1 also has a heater system configured to heat the second compartment 8. FIG. 2 shows an example of a suitable heater system. In the example shown, the device 1 includes an induction coil 18 suitable for heating the conveyor screw 11 by induction and consequently heating the second compartment 8. As shown, the induction coil 18 extends along the longitudinal axis X. The induction coil 18 surrounds the conveyor screw 11. In the example shown, the induction coil 18 is housed in the thickness of the wall 9, which is itself permeable to the electromagnetic field. Nevertheless, the invention is not limited to a heater system that serves to heat the second compartment by induction. Specifically, in a variant it is possible to make use of resistive heating for the purpose of heating the second compartment. Under such circumstances, one or more heater resistor wires may be present in the second compartment or in its proximity.

The method of generating dihydrogen using the device 1 shown in FIG. 1 is described below. Initially, the hydrogen storage material is present in the bottom portion 4a of the first compartment 4, the top portion 4b of the first compartment 4 having no spent hydrogen storage material; and as shown in FIG. 1, the tray 15 is positioned at the outlet 13b of the second compartment (high position). The drive system is then actuated to cause the conveyor screw 11 to rotate about the longitudinal axis X. As a result of the conveyor screw 11 rotating, the hydrogen storage material present at the inlet 13a of the second compartment 8 is transported towards the outlet 13b of the second compartment 8. While it is being transported through the second compartment 8, the hydrogen storage material is heated by the heater system so as to release the gaseous dihydrogen. Furthermore, as explained above, the rotation of the shaft 12 of the conveyor screw 11 acts simultaneously with transporting the hydrogen storage material to cause the first wall 6 to rotate about the longitudinal axis X, and consequently causes the recovery tray 15 to move downwards. Thus, as the hydrogen storage material is transported into the second compartment 8, the volume of the bottom portion 4a of the first compartment 4 decreases while the volume of the top portion 4b of the first compartment 4 increases. The sum of the volume of the bottom portion 4a plus the volume of the top portion 4b is constant during the process of generating gaseous dihydrogen. After passing through the second compartment 8, the spent hydrogen storage material is recovered by the tray 15 at the outlet from the second compartment 8. As dihydrogen is generated, the top portion 4b of the first compartment 4 becomes filled with spent hydrogen storage material while the bottom portion 4a of the first compartment becomes emptied of hydrogen storage material. The dihydrogen that is generated is discharged through one or more discharge orifices (see orifice 29 in FIG. 3) present in the top wall 17b. Once the process of generating hydrogen has terminated, the device is opened by removing the top wall 17b, and the spent hydrogen storage material is removed from the first compartment. The tray 15 is then removed and a fill of hydrogen storage material is put into the first compartment for the next use. The tray 15 is then repositioned in the first compartment, and then the device is closed by putting the top wall 17b into place, the device then being ready for new use.

FIG. 3 shows an example of a fuel cell system of the invention. Such a system comprises a device 1 of the invention, e.g. as shown in FIG. 1, together with a fuel cell 30. The fuel cell 30 includes a cathode 32, an electrolyte 34, and an anode 36. As shown in FIG. 3, the anode 36 communicates with the discharge orifice 29 present in the top wall 17b of the device 1 via the channel 28. The generated dihydrogen is taken via the channel 28 from the discharge orifice 29 to the anode 36. In an embodiment, it is possible to add a device for filtering the dihydrogen and possibly also an expander and a valve, e.g. a solenoid valve between the discharge orifice 29 and the anode 36.

The system of the invention may advantageously be present in an aircraft, e.g. for powering various secondary systems of the aircraft (systems that do not serve to enable the aircraft to move) such as the cabin ventilation system, galleys present on board the aircraft, or the de-icing system of the aircraft. In a variant, the system of the invention may be present in an aircraft and may deliver energy useful for causing the aircraft to move. By way of example, the energy produced by said system may be used to power a stage of taxiing and/or a stage of flight. In particular, the system of the invention may be integrated in an aircraft with electric propulsion. The system of the invention may also form part of the auxiliary power unit of an aircraft. Implementing the system of the invention is advantageous insofar as it makes it possible to avoid consuming fossil fuel.

FIG. 4 shows a variant embodiment in which a single motor M of the drive system is configured to actuate both the conveyor system and also the movement of the recovery support by means of magnetic coupling. In the example shown in FIG. 4, the bottom wall 17'a is present between a first rotary magnetic element 25a and a second rotary magnetic element 25b. The first magnetic element 25a is present outside the body 2, and the second magnetic element 25b is present inside the body 2 and is connected to the shaft of the conveyor screw 11. There is no mechanical contact between the first magnetic element 25a and the second magnetic element 25b. The motor M of the drive system imparts rotation to the first magnetic element 25a. As a result of this rotation, the second magnetic element 25b is driven in rotation about the axis X (magnetic coupling), thereby having the effect of causing the conveyor screw 11 to rotate and thus actuating the conveyor system. The rotation of the conveyor screw 11 also drives rotation of a gear system, e.g. comprising, as in the example shown, an inner toothed wheel 20'a co-operating with one or more outer toothed wheels 20'b, which outer toothed wheels co-operate with the first wall 6, the wall 6 itself having teeth. Consequently, when the drive system imparts rotary motion to the second magnetic element 25b, this rotary motion is transmitted via the gear system to the first wall 6, thereby actuating movement of the tray 15 in the first compartment 4. In the example shown, the first edge 15a of the tray 15 is connected to the first wall 6 via a slideway connection 16, and the second edge 15b of the tray 15 is connected to the second wall 9 via a helical connection 16a. In this embodiment, the second wall 9 remains stationary during rotation of the first wall 6.

This solution using magnetic coupling advantageously provides excellent sealing against the dihydrogen generated as a result of using a bottom wall 17'a that is not pierced, and constitutes a solution that is simpler to implement than the solution using a mechanical seal.

The term "lying in the range . . . to . . . " should be understood as including the bounds.

The invention claimed is:

1. A device for generating gaseous dihydrogen, the device comprising:
    a body defining an inside volume having present therein:
        a storage first compartment defined by a first wall, a hydrogen storage material being present in the first compartment;
        a conveyor second compartment, the first compartment surrounding the second compartment and being separated therefrom by a second wall, a conveyor system being present in the second compartment and being configured to transport the hydrogen storage material from an inlet of the second compartment communicating with the first compartment to an outlet of the second compartment; and
        a recovery support in communication with the outlet of the second compartment and connected to the first and second walls, said support being configured to be moved in the first compartment;
    a drive system for actuating the conveyor system and the movement of the recovery support in the first compartment; and
    a heater system configured to heat the second compartment.

2. A device according to claim 1, wherein the heater system is configured to heat the second compartment by induction.

3. A device according to claim 1, wherein the conveyor system and the movement of the recovery support are configured to be driven by a single motor of the drive system.

4. A device according to claim 1, wherein the drive system includes at least one motor configured to actuate at least the conveyor system via a magnetic coupling.

5. A device according to claim 1, wherein the conveyor system is in the form of a conveyor screw.

6. A device according to claim 1, a first edge of the recovery support being connected to the first wall via a slideway connection, and a second edge of said recovery support being connected to the second wall via a helical connection, and the first and second walls being configured to be caused to rotate relative to each other by the drive system so as to cause the recovery support to move along the longitudinal axis of the first compartment.

7. A fuel cell system comprising:
    a device according to claim 1; and
    a fuel cell having an anode connected to said device, the anode being designed to be fed with the gaseous dihydrogen generated by said device.

8. An aircraft fitted with a system according to claim 7.

9. A method of generating gaseous dihydrogen by using a device according to claim 1, the method comprising actuating by the drive system the conveyor system in order to transport the hydrogen storage material from the inlet of the second compartment towards the outlet of the second compartment, the hydrogen storage material being heated by the heater system while it is being transported in the second compartment in order to generate gaseous dihydrogen, the spent hydrogen storage material being recovered by the recovery support at the outlet of the second compartment.

10. A method according to claim 9, wherein the hydrogen storage material is in granular form.

11. A method of feeding a fuel cell with dihydrogen, the method comprising generating gaseous dihydrogen by performing a method according to claim 9, and taking the gaseous dihydrogen as generated in this way to an anode of a fuel cell.

* * * * *